(12) United States Patent
Chang

(10) Patent No.: US 10,579,197 B2
(45) Date of Patent: *Mar. 3, 2020

(54) TOUCH SENSITIVE PROCESSING METHOD

(71) Applicant: EGALAX_EMPIA TECHNOLOGY INC., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/213,183

(22) Filed: Dec. 7, 2018

(65) Prior Publication Data

US 2019/0107903 A1 Apr. 11, 2019

Related U.S. Application Data

(63) Continuation-in-part of application No. 15/393,453, filed on Dec. 29, 2016, now Pat. No. 10,185,452.

(30) Foreign Application Priority Data

Dec. 31, 2015 (TW) .............................. 104144643 A

(51) Int. Cl.
*G06F 3/045* (2006.01)
*G06F 3/044* (2006.01)
*G06F 3/041* (2006.01)

(52) U.S. Cl.
CPC .......... *G06F 3/044* (2013.01); *G06F 3/04182* (2019.05)

(58) Field of Classification Search
CPC ...... G06F 3/041; G06F 3/0416; G06F 3/0418; G06F 3/04182; G06F 3/044;
(Continued)

(56) References Cited

U.S. PATENT DOCUMENTS 5,944,833 A 8/1999 Ugon
2010/0170726 A1 7/2010 Yeh et al.
(Continued)

FOREIGN PATENT DOCUMENTS

TW 491978 6/2002
TW 201112068 4/2011
TW 201403421 1/2014

*Primary Examiner* — Joe H Cheng
(74) *Attorney, Agent, or Firm* — WPAT, PC

(57) ABSTRACT

A touch sensitive processing method applicable to a touch sensitive processing device connecting with a touch sensitive screen, wherein the touch sensitive screen includes multiple first electrodes being parallel to each other and multiple second electrodes being parallel to each other, wherein both the first and the second electrodes form multiple intersectional points, the touch sensitive processing device comprises a driving circuit configured to connect with at least one of the first electrodes of the touch sensitive screen; a sensing circuit configured to connect with the second electrodes; and a processor configured to connect with the driving circuit and the sensing circuit and to perform the touch sensitive processing method, wherein the touch sensitive processing method comprising: commanding the driving circuit to continuously drive the at least one of the first electrodes three times; and commanding the sensing circuit to detect changes in capacitance by the second electrodes for detecting an object, wherein two cease-driving durations between the three drivings are different.

7 Claims, 4 Drawing Sheets

(58) Field of Classification Search
CPC ........ G06F 3/0484; G06F 1/00; G06F 1/0335; G06F 1/04; G09G 3/2011; G09G 3/2018; G09G 3/2066; G09G 2320/00; G09G 2320/0209; G09G 2320/06; G09G 2340/0435; G09G 2340/14
See application file for complete search history.

(56) References Cited

U.S. PATENT DOCUMENTS

| | | | |
|---|---|---|---|
| 2011/0084930 A1* | 4/2011 | Chang | G06F 3/0416 345/173 |
| 2014/0049705 A1 | 2/2014 | Sugita et al. | |
| 2014/0111446 A1 | 4/2014 | Lee et al. | |
| 2014/0267156 A1 | 9/2014 | Koga et al. | |
| 2015/0002421 A1 | 1/2015 | Kim et al. | |
| 2018/0121015 A1* | 5/2018 | Yeh | G06F 3/044 |
| 2018/0121016 A1* | 5/2018 | Yeh | G06F 3/044 |

* cited by examiner

10,579,197 B2

TOUCH SENSITIVE PROCESSING METHOD

CROSS REFERENCE TO RELATED APPLICATION

This application is a continuation-in-part application of U.S. patent application Ser. No. 15/393,453, filed on Dec. 29, 2016, now U.S. Pat. No. 10,185,452 B2, which claims priority to Taiwan patent application, 104144643, filed on Dec. 31, 2015, the disclosures of which are incorporated herein by reference.

BACKGROUND OF THE INVENTION

1. Field of the Invention

The present invention relates to the field of touch sensitive technology, and more particularly, to a touch sensitive technique with which reduces cyclical electromagnetic interference (EMI).

2. Description of the Prior Art

Consumer electronic products have already been necessities of modern life. Such as tablet computers, mobile phones, and other electronic devices, most of them use the touch sensitive screen as their main input/output interface. In addition, they are also configured with WiFi wireless networking devices, such as Bluetooth devices, individual short-distance wireless communication devices, the third or fourth generation of mobile communication network equipment, wireless charging devices, global positioning systems (GPSs), and so on. These wireless devices require to equip antennas in their thin, short, and limited device bodies. When these antennas transmit or emit signals, they will cause electromagnetic interference (EMI) with each other.

For example, a projected capacitive touch sensitive screen which is commonly used now, and the touch sensitive controlling device thereof typically adopts mutual-capacitive detection. It commands a part of or all of electrodes to emit driving signal in order to detect the external conductive object(s) approaching or approximating the touch sensitive screen. The emitted driving signal and the signal related to the resonance frequency of the driving signal will cause electromagnetic interference with other antennas and wireless devices in the same electronic device.

Furthermore, in some situations, when the touch sensitive controlling device provides the driving signals to the electrodes, there is usually a certain time interval between each two of the driving signals, or the touch sensitive controlling device emits the driving signals cyclically. However, compared to those random noise signals, these cyclical driving signals (may also be referred as cyclical interference signals sometimes), to some communication systems, may further block or interfere with information transmission. In certain cases, for example, the spreading spectrum communication systems have a stronger resistance to or anti-interference with white noise.

Accordingly, there is a requirement for a touch sensitive controlling device, system, and controlling method thereof that reduce cyclical electromagnetic interference with.

SUMMARY OF THE INVENTION

According to an embodiment, the present invention provides a touch sensitive controlling method including continuously driving electrode(s) of a touch sensitive screen three times, wherein two cease-driving durations between the three drivings are different.

In some embodiments, the driving mentioned above includes one of followings: driving for a whole touch sensitive screen; driving for a mutual capacitive touch sensitive screen; and driving for a part of a touch sensitive screen.

In some embodiments, a time length of the cease-driving duration relates to at least one of followings: a number of interrupt-calling received by a processor performing the touch sensitive controlling method in the cease-driving duration; a type of interrupt-calling received by the processor performing the touch sensitive controlling method in the cease-driving duration; and a consumption time of interrupt service routine in response to interrupt-calling received by the processor performing the touch sensitive controlling method in the cease-driving duration.

In some embodiments, a time length of the cease-driving duration relates to a result produced by a processor performing the touch sensitive controlling method to run a random number generating function.

According to an embodiment, the present invention provides a touch sensitive processing device configured to connect with a touch sensitive screen, the touch sensitive processing device includes: at least one driving circuit, configured to connect with electrode(s) of the touch sensitive screen; and a processor configured to connect with the driving circuit, and to command the driving circuit to continuously drive electrode(s) of the touch sensitive screen three times, wherein two cease-driving durations between the three drivings are different.

In some embodiments, the driving mentioned above includes one of followings: driving for a whole touch sensitive screen; driving for a mutual capacitive touch sensitive screen; and driving for a part of a touch sensitive screen.

In some embodiments, a time length of the cease-driving duration relates to at least one of followings: a number of interrupt-calling received by the processor in the cease-driving duration; a type of interrupt-calling received by the processor in the cease-driving duration; and a consumption time of interrupt service routine in response to interrupt-calling received by the processor in the cease-driving duration.

In some embodiments, a time length of the cease-driving duration relates to a result produced by the processor to run a random number generating function.

According to an embodiment, the present invention provides an electronic device including: a touch sensitive screen including multiple electrodes; and a touch sensitive processing device configured to connect with the touch sensitive screen. The touch sensitive processing device includes: at least one driving circuit, configured to connect with the electrodes of the touch sensitive screen; and a processor configured to connect with the driving circuit, and to command the driving circuit to continuously drive the electrodes of the touch sensitive screen three times, wherein two cease-driving durations between the three drivings are different.

In some embodiments, the driving mentioned above includes one of followings: driving for a whole touch sensitive screen; driving for a mutual capacitive touch sensitive screen; and driving for a part of a touch sensitive screen.

In some embodiments, a time length of the cease-driving duration relates to at least one of followings: a number of interrupt-calling received by the processor in the cease-driving duration; a type of interrupt-calling received by the processor in the cease-driving duration; and a consumption time of interrupt service routine in response to interrupt-calling received by the processor in the cease-driving duration.

In some embodiments, a time length of the cease-driving duration relates to a result produced by the processor to run a random number generating function.

According to an embodiment, the present invention provides a touch sensitive processing method applicable to a touch sensitive processing device connecting with a touch sensitive screen, wherein the touch sensitive screen includes multiple first electrodes being parallel to each other and multiple second electrodes being parallel to each other, wherein both the first and the second electrodes form multiple intersectional points, the touch sensitive processing device comprises a driving circuit configured to connect with at least one of the first electrodes of the touch sensitive screen; a sensing circuit configured to connect with the second electrodes; and a processor configured to connect with the driving circuit and the sensing circuit and to perform the touch sensitive processing method, wherein the touch sensitive processing method comprising: commanding the driving circuit to continuously drive the at least one of the first electrodes three times; and commanding the sensing circuit to detect changes in capacitance by the second electrodes for detecting an object, wherein two cease-driving durations between the three drivings are different.

In some embodiments, in order to perform a whole-touch-sensitive-screen detection, the driving further comprises driving all of the first electrodes of the touch sensitive screen. In the whole-touch-sensitive-screen detection, only one driving is needed. If any external conductive object is on or near the touch sensitive screen, the detections of capacitance changes on the second electrodes performed by the sensing circuit can indicate the existence of the external conductive object.

In some embodiments, in order to perform a quick detection, the driving further comprises driving multiple of the first electrodes of the touch sensitive screen.

In some embodiments, in order to prevent electromagnetic interferences in a certain frequency to nearby environment, a time length of the cease-driving duration relates to a number of interrupt-calling received by the processor in the cease-driving duration.

In some embodiments, in order to prevent electromagnetic interferences in a certain frequency to nearby environment, a time length of the cease-driving duration relates to a type of interrupt-calling received by the processor in the cease-driving duration.

In some embodiments, in order to prevent electromagnetic interferences in a certain frequency to nearby environment, a time length of the cease-driving duration relates to a consumption time of interrupt service routine in response to interrupt-calling received by the processor in the cease-driving duration.

In some embodiments, in order to prevent electromagnetic interferences in a certain frequency to nearby environment, a time length of the cease-driving duration relates to a result produced by the processor to run a random number generation function.

To sum up the claimed function, the present invention provides a touch sensitive processing method, a touch sensitive controlling method, touch sensitive processing device and electronic device that emits driving signals having less order and higher scattered degree so as to avoid coinciding to certain communication protocols' cycle, multiple cycles, or fractional cycle, and thus further to reduce electromagnetic interference with other communication parts of the electronic device or of other around electronic devices.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
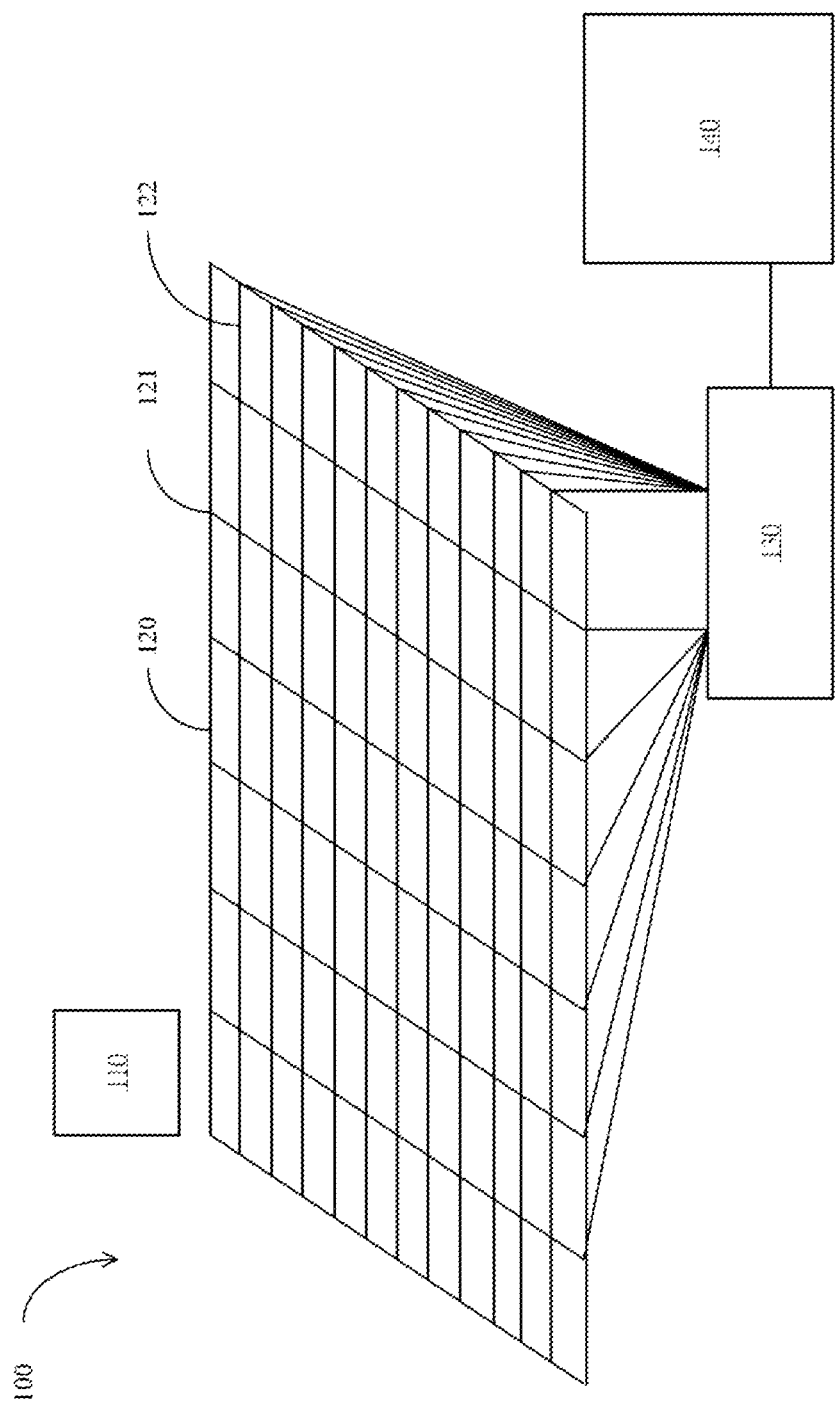
FIG. 1 illustrates an electronic device 100 according to an embodiment of the present invention.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Referring to FIG. 1, an electronic device 100 according to an embodiment of the present invention is illustrated. The electronic device 100 includes a touch sensitive panel or touch sensitive screen 120, and thereinafter, for the convenience of illustration and explanation, the term of touch sensitive screen used in this application encompasses touch sensitive panel, and vice versa. The touch sensitive screen 120 includes multiple first electrodes 121 being parallel with each other and multiple second electrodes 122 being parallel with each other, and both of the first and the second electrodes form multiple intersectional points. The electronic device 100 further includes a touch sensitive processing device 130 connecting with each of the first electrodes 121 and each of the second electrodes 122 for detecting the external conducting object 110. The electronic device 100 further includes a host 140 connecting with the touch sensitive processing device 130.

In some embodiments, the host 140 may be one or some processor(s) and memory/memories which perform an operation system for controlling the electronic device 100. For example, such as Intel x86 instruction set processor performing Microsoft Windows system; Qualcomm ARM instruction set processor performing Google Android system; Apple A9 processor performing Apple iOS system, and so on.

In some embodiments, the touch sensitive processing device 130 includes an embedded processor, for example, such as Intel i960 processor, 8051 processor, ARM Cortex M series of processors, ARM7, ARM9, etc. The processor embedded in the touch sensitive processing device 130 can perform related touch sensitive instructions for controlling the electrical signals emitting and receiving by each of the first electrodes 121 and each of the second electrodes 122, and then transmits the touch related information got from after being processed to the host 140.

Figure 2A:
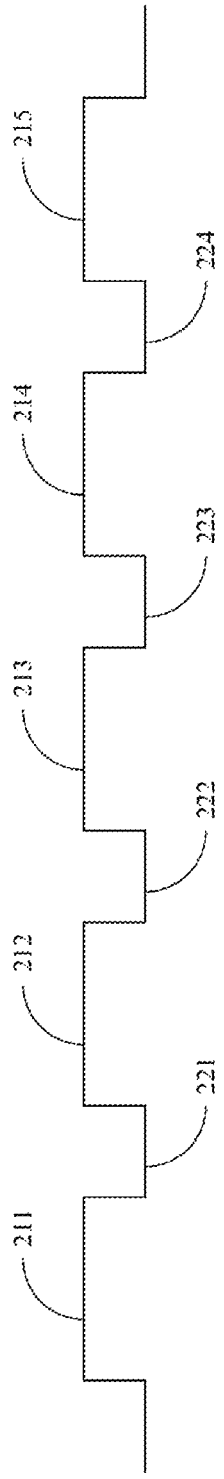
FIG. 2A illustrates a waveform of a driving signal in the prior art.

Referring to FIG. 2A, a waveform of a driving signal in the prior art is illustrated. When a mutual capacitive detection is performed, the touch sensitive processing device 130 commands each first electrode 121 to emit the driving signal in sequence, and commands each second electrode 122 to detect the change in capacitance, and then detects the approximate external conductive object 110. In the waveform of FIG. 2A, a first rising-up waveform 211 is a driving signal emitted by a first of the first electrodes 121, a second rising-up waveform 212 is a driving signal emitted by a second of the first electrodes 121, a third rising-up waveform 213 is a driving signal emitted by a third of the first electrodes 121, and so on. In certain embodiments, the driving signal may be in 20 KHz, 40 KHz, 60 KHz, etc., and may be square wave or sinusoidal wave. The present invention is not limited to the frequency and form of the driving signal.

In FIG. 2A, several cease-driving durations are among waveforms. For example, a duration 221 is between the waveforms 211 and 212, a duration 222 is between the waveforms 212 and 213, a duration 223 is between the waveforms 213 and 214, a duration 224 is between the waveforms 214 and 215. These durations have the same length in time or are almost equal to each other.

As mentioned in the background, to other antennas and receivers in the electronic device 100, the driving signals cyclically emitted by each first electrode 121 are cyclical electromagnetic interference (EMI). Since the durations between the driving signals are the same, this kind of electromagnetic interference has order and does not lie scattered. To some receivers, an order electromagnetic interference is more serious than a disorder electromagnetic interference. Because the cycle of the order electromagnetic interference may coincide with the cycle or the multiple cycle or the fractional cycle of the received information, and this leads to some parts of the received information being continuously interfered with, and then causes the information transmitting efficiency to be seriously damaged and even be totally interrupted.

For example, certain a wireless communication protocol uses the cycle form of time slot to define the transmitted information. Certain time slots of each cycle carry the description data of other time slots, and these time slots are called header time slots. When the cycle of the abovementioned driving signal coincides with the cycle or the multiple cycle or the fractional cycle of the wireless communication protocol, it may cause every or every few header time slot(s) to be interfered with. Once the description data carried by certain a header time slot is error, it will cause general time slot data described by the header time slot to be interpreted erroneously. Thus, one of the purposes of the present invention is to reduce cyclical electromagnetic interference to protect other wireless communication devices in the electronic device 100 from being seriously interfered with.

Figure 2B:
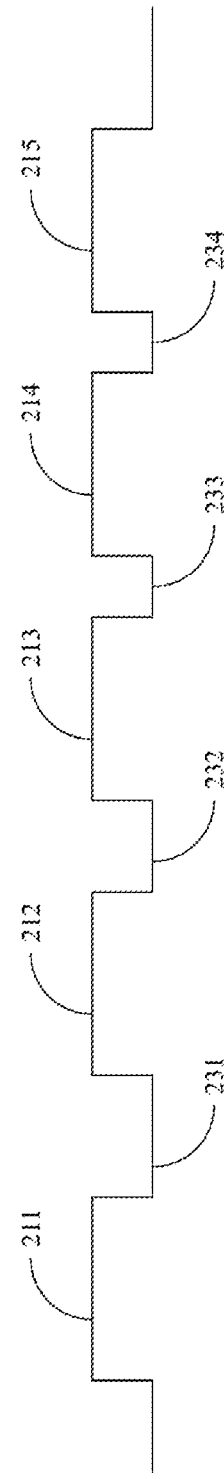
FIG. 2B illustrates a waveform of a driving signal according to an embodiment of the present invention.

Referring to FIG. 2B, a waveform of a driving signal according to an embodiment of the present invention is illustrated. The time length of each duration, such as durations 221, 222, 223, and 224, shown in FIG. 2A is the same length or almost equal to each other, for example, three unit of time length. However, the time length of each duration, such as 231, 232, 233, 234, shown in FIG. 2B is different from each other. In some embodiments, at least, two durations among three continuous driving signals have different time lengths. For example, the durations 231-234 respectively have the time lengths in 4, 3, 2, and 2. Accordingly, the order of the driving signal of FIG. 2B is lower than that of the driving signal of FIG. 2A. The driving signal of FIG. 2B is close to white noise and it has higher scattering level.

To the abovementioned wireless communication protocol, the electromagnetic interference caused by the driving signal will not coincide with the cycle or the multiple cycle or the fractional cycle of the header time slot all along, thus the description information in at least some parts of the header time slots can be correctly interpreted. This improves the accuracy of interpretation of general time slots' data described by the header time slot.

Although the embodiment of FIG. 2B uses the driving signal in a mutual capacitive detection as an example, it can also be applied to other detections. In some embodiments, the driving processing device 130 may perform a whole screen driving to determine whether external conductive object 110 approximates or not. When an approximate issue happens, it can switch to the mutual capacitive detection mentioned above. So-called a whole screen driving is to make all first electrodes 121 emitting the driving signal, and if there is no detection for any approximate issue taken place, it can perform the whole screen driving after certain a time interval. In other words, the whole screen driving in the prior art is cyclical, and according to the whole screen driving for an embodiment of the present invention, two durations in at least three continuous whole screen drivings have different time length.

Similarly, in the prior art, certain technologies may have the detection with driving a part of the first electrodes 121. However, as long as the same driving signal, they all can be applied to the driving method provided by the present invention. That is, two durations between at least three same and continuous driving waveforms have different time lengths. In other words, applications for the present invention are not limited to the abovementioned mutual capacitive detection, whole screen driving detection, parts of driving detection, and so on.

The method for how to achieve durations with different time lengths will be introduced below. In some embodiments, the instructions performed by the processor of the abovementioned touch sensitive processing device 130 includes a random number generating function and a sleeping function. The sleeping instruction has an input parameter being used to assign the time length of sleep of the processor. For example, a duration with an upper limit U and a lower limit D would be generated, the following instruction sequence can be used:

floating X=random number generating function( );
    sleeping duration Duration=(U−D)*X+D;
    sleeping function(Duration);

For example, when the upper limit is 4 units of time and the lower limit is 2 units of time, the sleeping duration Duration is the random numbers between 2-4 units of time. The abovementioned instruction sequence may be performed after cyclical driving, and sleeping function has been performed, the processor can perform driving operation again.

In a variant, loop is used to replace sleeping duration, such as the following instruction sequence:

floating X=random number generating function( )
    loop number Iteration=(U−D)*X+D;
    loop (Duration);

For example, when the upper limit is one hundred thousand times and the lower limit is fifty thousand times, the loop numbers are the random numbers between 50-100 thousand times. When certain an instruction in the loop takes certain unit of time to be performed, the abovementioned instruction sequence can get 50-100 thousand times of the time of performing the instruction as the duration, and the loops have been over, the driving operation is performed again.

In some embodiments, before entering cyclical interval duration, the processor of the touch sensitive processing device 130 opens interrupt call (IRC). The interrupt call from hardware or software will let the processor to interrupt interval duration to perform interrupt service routine (ISR). However, the processor of the touch sensitive processing device 130 does not know whether being interrupted or not, and does not know what kind of interrupt, and even does not know how long the ISR will take. Therefore, the time lengths of two continuous durations change with interrupt call, and then to achieve the purpose of the present invention, that is, two durations of at least three continuous same waveforms have different time lengths.

In some embodiments, before entering cyclical interval duration, the processor of the touch sensitive processing device 130 opens interrupt call (IRC). After each interrupt call, the interval duration is reset. The processor of the touch sensitive processing device 130 does not know whether being interrupted or not, and does not know what kind of interrupt, and even does not know how long the ISR will take, and thus, the time lengths of two continuous durations change with interrupt call. This leads to achieve the purpose of the present invention, that is, two durations of at least three continuous same waveforms have different time lengths.

Figure 3:
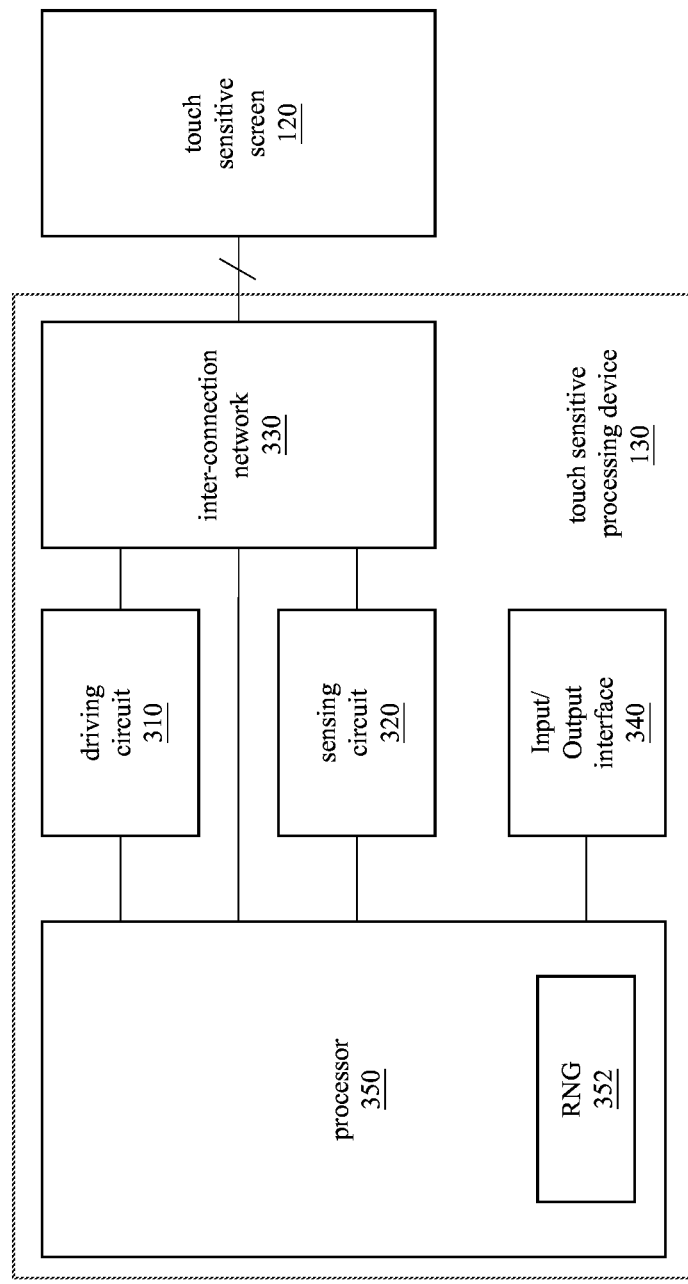
FIG. 3 shows a block diagram of a touch sensitive processing device 130 according to an embodiment of the present invention.

Please refer to FIG. 3, which shows a block diagram of a touch sensitive processing device 130 according to an embodiment of the present invention. The touch sensitive processing device 130 comprises a driving circuit 310, a sensing circuit 320, an interconnection network 330, an input/output interface 340 and a processor 350. The processor 350 is configured to connect and to control the driving circuit 310, the sensing circuit 320, the interconnection network 330 and the input/output interface 340. The processor 350 is also configured to fetch instructions from a non-transitory computer readable medium and to execute the fetched instructions.

The interconnection network 330 is configured to connect to each of the first electrodes 121 and each of the second electrodes 122 of the touch sensitive screen 120. Crossbar architecture may be used to build the interconnection network 330. The driving circuit 310 can be configured to connect to any one or more of the first electrodes 121 and the second electrodes 122. The driving circuit 310 may comprise amplifier, filter, digital-to-analogic converter, clock generator and clock regulator circuits to provide a driving signal to one or more of the first electrodes 121 and the second electrodes 122 via the interconnection network 330.

Similarly, the sensing circuit 320 can be configured to connect to any one or more of the first electrodes 121 and the second electrodes 122. The sensing circuit 320 may comprise amplifier, filter, sampling circuit, integrator circuit, analog-to-digital converter circuit to detect, to sense, and/or to measure the driving signal induced on one or more of the first electrodes 121 and the second electrodes 122 via the interconnection network 330.

The processor 350 may receive hardware interrupts from the input/output interface 340 such as clocking interface and may receive software interrupts from instructions executed by the processor 350 itself. According to the Wikipedia "Interrupt" page, an interrupt is a signal to the processor emitted by hardware or software indicating an event that needs immediate attention. The processor responds by suspending its current activities, saving its state, and executing a function called an interrupt handler or an interrupt service routine, ISR, to deal with the event. There are two types of interrupts: hardware interrupts and software interrupts.

As shown in FIG. 3, the processor 350 may comprise a hardware implementation of random number generator, RNG 352. The RNG block 352 may be implemented by a mix of hardware and software/firmware depending on implementation considerations. Many commercial chips such as Intel x64 and IA-32 instruction set architectures already provide one or more instructions for generating a random number or a pseudo random number. The processor 350 may generate a pseudo random number by pure software implementation. Technically, a pseudo random number in computer science is taken as a random number.

Figure 4:
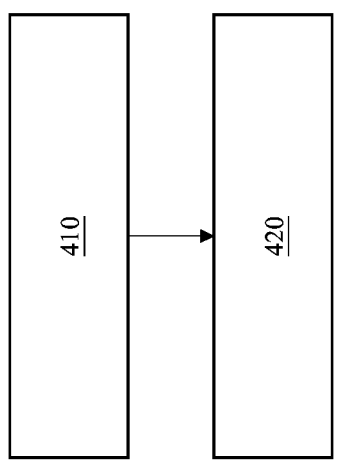
FIG. 4 shows a flowchart diagram of a touch sensitive processing method in accordance with an embodiment of the present invention.

Please refer to FIG. 4, which shows a flowchart diagram of a touch sensitive processing method in accordance with an embodiment of the present invention. The touch sensitive processing method is applicable to a touch sensitive processing device 130, which may be the device 130 shown in FIGS. 1 and 3. The touch sensitive processing method may be implemented by instructions which are executable by the processor 350 of the touch sensitive device 130. The instructions may be stored in a non-transitory computer readable medium such as ROM (read-only memory) or EEPROM (electrically erasable and programmable read-only memory).

The flowchart comprises step 410 and step 420. In step 410, commanding the driving circuit 310 to continuously drive the at least one of the first electrodes 121 three times. In step 420, commanding the sensing circuit 320 to detect changes in capacitance by the second electrodes 122 for detecting an object. And during the execution duration of the steps 410 and 420, two cease-driving durations between the three drivings are different.

According to an embodiment, the present invention provides a touch sensitive processing method applicable to a touch sensitive processing device connecting with a touch sensitive screen, wherein the touch sensitive screen includes multiple first electrodes being parallel to each other and multiple second electrodes being parallel to each other, wherein both the first and the second electrodes form multiple intersectional points, the touch sensitive processing device comprises a driving circuit configured to connect with at least one of the first electrodes of the touch sensitive screen; a sensing circuit configured to connect with the second electrodes; and a processor configured to connect with the driving circuit and the sensing circuit and to perform the touch sensitive processing method, wherein the touch sensitive processing method comprising: commanding the driving circuit to continuously drive the at least one of the first electrodes three times; and commanding the sensing circuit to detect changes in capacitance by the second electrodes for detecting an object, wherein two cease-driving durations between the three drivings are different.

In some embodiments, in order to perform a whole-touch-sensitive-screen detection, the driving further comprises driving all of the first electrodes of the touch sensitive screen. In the whole-touch-sensitive-screen detection, only one driving is needed. If any external conductive object is on or near the touch sensitive screen, the detections of capacitance changes on the second electrodes performed by the sensing circuit can indicate the existence of the external conductive object.

In some embodiments, in order to perform a quick detection, the driving further comprises driving multiple of the first electrodes of the touch sensitive screen.

In some embodiments, in order to prevent electromagnetic interferences in a certain frequency to nearby environment, a time length of the cease-driving duration relates to a number of interrupt-calling received by the processor in the cease-driving duration.

In some embodiments, in order to prevent electromagnetic interferences in a certain frequency to nearby environment, a time length of the cease-driving duration relates to a type of interrupt-calling received by the processor in the cease-driving duration.

In some embodiments, in order to prevent electromagnetic interferences in a certain frequency to nearby environment, a time length of the cease-driving duration relates to a consumption time of interrupt service routine in response to interrupt-calling received by the processor in the cease-driving duration.

In some embodiments, in order to prevent electromagnetic interferences in a certain frequency to nearby environment, a time length of the cease-driving duration relates to a result produced by the processor to run a random number generation function.

According to an embodiment, the present invention provides a touch sensitive controlling method including continuously driving electrode(s) of a touch sensitive screen three times, wherein two cease-driving durations between the three drivings are different.

In some embodiments, the driving mentioned above includes one of followings: driving for a whole touch sensitive screen; driving for a mutual capacitive touch sensitive screen; and driving for a part of a touch sensitive screen.

In some embodiments, a time length of the cease-driving duration relates to at least one of followings: a number of interrupt-calling received by a processor performing the touch sensitive controlling method in the cease-driving duration; a type of interrupt-calling received by the processor performing the touch sensitive controlling method in the cease-driving duration; and a consumption time of interrupt service routine in response to interrupt-calling received by the processor performing the touch sensitive controlling method in the cease-driving duration.

In some embodiments, a time length of the cease-driving duration relates to a result produced by a processor performing the touch sensitive controlling method to run a random number generating function.

According to an embodiment, the present invention provides a touch sensitive processing device configured to connect with a touch sensitive screen, the touch sensitive processing device includes: at least one driving circuit, configured to connect with electrode of the touch sensitive screen; and a processor configured to connect with the driving circuit, and to command the driving circuit to continuously drive electrode(s) of the touch sensitive screen three times, wherein two cease-driving durations between the three drivings are different.

In some embodiments, the driving mentioned above includes one of followings: driving for a whole touch sensitive screen; driving for a mutual capacitive touch sensitive screen; and driving for a part of a touch sensitive screen.

In some embodiments, a time length of the cease-driving duration relates to at least one of followings: a number of interrupt-calling received by the processor in the cease-driving duration; a type of interrupt-calling received by the processor in the cease-driving duration; and a consumption time of interrupt service routine in response to interrupt-calling received by the processor in the cease-driving duration.

In some embodiments, a time length of the cease-driving duration relates to a result produced by the processor to run a random number generating function.

According to an embodiment, the present invention provides an electronic device including: a touch sensitive screen including multiple electrodes; and a touch sensitive processing device configured to connect with the touch sensitive screen. The touch sensitive processing device includes: at least one driving circuit, configured to connect with the electrodes of the touch sensitive screen; and a processor configured to connect with the driving circuit, and to command the driving circuit to continuously drive the electrodes of the touch sensitive screen three times, wherein two cease-driving durations between the three drivings are different.

In some embodiments, the driving mentioned above includes one of followings: driving for a whole touch sensitive screen; driving for a mutual capacitive touch sensitive screen; and driving for a part of a touch sensitive screen.

In some embodiments, a time length of the cease-driving duration relates to at least one of followings: a number of interrupt-calling received by the processor in the cease-driving duration; a type of interrupt-calling received by the processor in the cease-driving duration; and a consumption time of interrupt service routine in response to interrupt-calling received by the processor in the cease-driving duration.

In some embodiments, a time length of the cease-driving duration relates to a result produced by the processor to run a random number generating function.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A touch sensitive processing method applicable to a touch sensitive processing device connecting with a touch sensitive screen, wherein the touch sensitive screen includes multiple first electrodes being parallel to each other and multiple second electrodes being parallel to each other, wherein both the first and the second electrodes form multiple intersectional points, the touch sensitive processing device comprises a driving circuit configured to connect with at least one of the first electrodes of the touch sensitive screen; a sensing circuit configured to connect with the second electrodes; and a processor configured to connect with the driving circuit and the sensing circuit and to perform the touch sensitive processing method, wherein the touch sensitive processing method comprising:
commanding the driving circuit to continuously drive the at least one of the first electrodes three times; and
commanding the sensing circuit to detect changes in capacitance by the second electrodes for detecting an object,
wherein two cease-driving durations between the three drivings are different.

2. The touch sensitive processing method of claim 1, wherein the driving further comprises driving all of the first electrodes of the touch sensitive screen.

3. The touch sensitive processing method of claim 1, wherein the driving further comprises driving multiple of the first electrodes of the touch sensitive screen.

4. The touch sensitive processing method of claim 1, wherein a time length of the cease-driving duration relates to a number of interrupt-calling received by the processor in the cease-driving duration.

5. The touch sensitive processing method of claim 1, wherein a time length of the cease-driving duration relates to a type of interrupt-calling received by the processor in the cease-driving duration.

6. The touch sensitive processing method of claim 1, wherein a time length of the cease-driving duration relates to a consumption time of interrupt service routine in response to interrupt-calling received by the processor in the cease-driving duration.

7. The touch sensitive processing method of claim 1, wherein a time length of the cease-driving duration relates to a result produced by the processor to run a random number generation function.

\* \* \* \* \*